US 9,503,885 B2

(12) United States Patent
Garcia Martin et al.

(10) Patent No.: US 9,503,885 B2
(45) Date of Patent: Nov. 22, 2016

(54) METHODS AND APPARATUS FOR PROVIDING A SUBSCRIBER IDENTITY

(75) Inventors: Miguel Angel Garcia Martin, Madrid (ES); Pablo Martinez de la Cruz, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 14/381,652

(22) PCT Filed: Apr. 3, 2012

(86) PCT No.: PCT/EP2012/056052
§ 371 (c)(1),
(2), (4) Date: Aug. 28, 2014

(87) PCT Pub. No.: WO2013/149650
PCT Pub. Date: Oct. 10, 2013

(65) Prior Publication Data
US 2015/0043430 A1 Feb. 12, 2015

(51) Int. Cl.
*H04W 8/20* (2009.01)
*H04L 29/12* (2006.01)
*H04L 29/06* (2006.01)
*H04W 80/06* (2009.01)
*H04W 92/02* (2009.01)

(52) U.S. Cl.
CPC ............ *H04W 8/205* (2013.01); *H04L 61/157* (2013.01); *H04L 61/1588* (2013.01); *H04L 69/169* (2013.01); *H04L 61/2514* (2013.01); *H04L 61/2582* (2013.01); *H04L 61/3095* (2013.01); *H04W 80/06* (2013.01); *H04W 92/02* (2013.01)

(58) Field of Classification Search
None
See application file for complete search history.

(56) References Cited

FOREIGN PATENT DOCUMENTS

| DE | WO 2010000298 A1 * | 1/2010 | ............ G06F 21/41 |
|---|---|---|---|
| WO | WO 2006/045402 | 5/2006 | |
| WO | WO 2010/000298 | 1/2010 | |
| WO | WO 2010/066295 | 6/2010 | |
| WO | WO 2011/107949 | 9/2011 | |

OTHER PUBLICATIONS

International Search Report for International application No. PCT/EP2012/056052, Jan. 18, 2013.

(Continued)

*Primary Examiner* — Andrew Lai
*Assistant Examiner* — Jamaal Henson
(74) *Attorney, Agent, or Firm* — Baker Botts, LLP

(57) ABSTRACT

There is provided a method of ensuring that an identifier for a subscriber of an IP Connectivity Access Network (IP-CAN) is available to a third-party service provider that can provide a service to the subscriber. The method comprises, at an application server of the third-party service provider, receiving a service request message from the subscriber, the service request message requesting access to the service, obtaining a source IP address and source port number from the service request message, generating an identity request message including the source IP address and source port number, the identity request message requesting a subscriber identifier associated with the source IP address and source port number, sending the identity request message to a node of the IP-CAN, and receiving an identity response message from the node of the IP-CAN, the response including a subscriber identifier that the IP-CAN associates with the subscriber.

18 Claims, 5 Drawing Sheets

(56) References Cited

OTHER PUBLICATIONS

"Diameter Network Address and Port Translation Control Application" by Brockners et al.; Telcordia Technologies, Oct. 25, 2011.
Technical Specification Digital cellular telecommunications system (Phase 2+); Universal Mobile Telecommunications System (UMTS); LTE; Sh interface based on the Diameter protocol; Protocol details (3GPP TS 29.329 version 9.5.0 Release 9), 2012.
The application/json Media Type for JavaScript Object Notation (JSON) by D. Crockford; JSON.org (Network Working Group; Request for Comments: 4627; Category: Informational), Jul. 2006.

* cited by examiner

METHODS AND APPARATUS FOR PROVIDING A SUBSCRIBER IDENTITY

PRIORITY

This nonprovisional application is a U.S. National Stage Filing under 35 U.S.C. §371 of International Patent Application Serial No. PCT/EP2012/056052, filed Apr. 3, 2012 and entitled "Methods and Apparatus for Providing A Subscriber Identity."

TECHNICAL FIELD

The present invention relates to methods and apparatus for providing a subscriber identity. More particularly, the present invention relates to methods and apparatus for ensuring that an identifier for a subscriber of an IP Connectivity Access Network (IP-CAN) is available to a third party service provider.

BACKGROUND

It is desirable for telecommunications network operators that provide IP connectivity (i.e. that provide an IP-CAN) to be able to allow trusted third parties to provide "over-the-top" (OTT) services to subscribers/users. For a number of reasons, it is also desirable that these third party service providers (3PSP) are able to cooperatively interact with the network operator. For example, a 3PSP may wish to cooperate with a network operator in order to implement charging, revenue sharing, enhanced service delivery, etc. To do so, the service provider and the network operator are required to be able to identify subscribers/users to each other, by using the same identifier to identify a subscriber/user even when they operate in different authentication domains.

In existing network deployments, this identification of subscribers/users is typically achieved by the IP-CAN deriving an identifier for a subscriber/user when an IP-CAN session has been established, and linking this subscriber identifier with application protocol messages that are being used to deliver a third party service over the established IP-CAN session. For example, a GSM or UMTS mobile network can determine the subscribers Mobile Subscriber ISDN Number (MSISDN), or an IP Multimedia Subsystem Public User Identity (IMPU) of the subscriber, and can then add a header field into the application/signalling protocol messages that includes this subscriber identifier. To do so, a proxy in the IP-CAN is required to receive the application/signalling messages sent towards the 3PSP by the subscriber, perform the insertion of this header field into the application/signalling protocol messages, and forward the signalling protocol messages towards the 3PSP. For example, a SIP proxy server such as a P-CSCF can insert the P-Asserted-Identity header field into SIP messages, and a HTTP proxy can insert the X-3GPP-Asserted-Identity header field into HTTP messages. The 3PSP thereby receives the subscriber identifier from the network operator, and can use this subscriber identifier when communicating with the network operator in order to implement charging, billing, enhanced service delivery, or any other matters.

FIG. 1 illustrates schematically the interaction between a conventionally deployed IP-CAN and a 3PSP in accordance with the scenario referred to above. An IP-CAN 100 implemented by operator A provides IP connectivity to a subscriber's device/terminal 101 (e.g. mobile phone, Smartphone, laptop computer, desktop computer etc.). The subscriber can therefore connect to an Application Server 102 of a 3PSP 103 via the public internet 104. An edge router 105 within the IP-CAN 100 forwards IP packets to/from the device 101. For example, the edge router 105 could be a PDN Gateway (P-GW) of an LTE network, or a GGSN of a GPRS network. A proxy server 106 is also provided within the IP-CAN 100 for proxying application/signalling messages. For example, the proxy server 106 could be a SIP proxy server (e.g. a P-CSCF in IMS), a RTSP proxy server, or a HTTP proxy server, depending upon the protocol used. The proxy server 106 routes and forwards signalling messages, including those intended for the 3PSP 103. In current solutions, the proxy server 106 obtains an identifier for the subscriber from a source within the IP-CAN 101, and inserts an application information element into the signalling protocol messages in order to provide the subscriber's identity to the 3PSP 103. The IP-CAN may also contain a Network Address (and Port) Translation (NAT) function 107. A NAT function 107 translates internal IP addresses (i.e. those allocated within the operator's network) to external IP addresses (i.e. used in the public Internet). Depending on the particular network deployment, the NAT function 107 can be co-located with the edge router 105. In addition, it is possible that several cascaded NAT functions can be implemented within an IP-CAN, with each NAT function providing translation between addresses used in different sub-networks within the IP-CAN.

With these conventional procedures for providing a subscriber identity to a 3PSP, a problem arises when the communication between the subscriber/user and the 3PSP is encrypted. In this situation, the proxy server 106 does not have means to decrypt the signalling protocol messages exchanged between the device 101 and the application server 102 of the 3PSP 103, and it therefore cannot add new header fields into the forwarded messages. As a result, the 3PSP 103 receives the signalling protocol messages, but is unable to determine the identity of the subscriber/user to which the messages refer. Among other things, this prevents the 3PSP from cooperating with the network operator using the subscriber identifier. The present invention aims to overcome this problem.

SUMMARY

According to a first aspect of the present invention there is provided an application server configured to provide a third-party service to a subscriber of an IP Connectivity Access Network (IP-CAN). The application server comprises a first receiver configured to receive a service request message from the subscriber, the service request message requesting access to the third-party service, a processor configured to obtain a source IP address and source port number from the service request message, and to generate an identity request message including the source IP address and source port number, the identity request message requesting a subscriber identifier associated with the source IP address and source port number. The application server also comprises a transmitter configured to send the identity request message to a node of the IP-CAN, and a second receiver configured to receive an identity response from the node of the IP-CAN, the identity response including a subscriber identifier that the IP-CAN associates with the subscriber.

The application server provides that a third-party service provider, providing a service to a subscriber of an IP-CAN, can obtain an identity of the subscriber that will be recognised by the IP-CAN as being associated with the subscriber, even if the communication between the subscriber and the third-party service provider is encrypted.

The processor may be further configured to determine a transport protocol used for the service request message, and to identify the transport protocol in the identity request message sent to the node of the IP-CAN. The processor may be further configured to, upon receipt of the service request message, decrypt the service request message.

According to a second aspect of the present invention there is provided a subscriber identification server configured for use within an IP Connectivity Access Network (IP-CAN). The subscriber identification server comprises a receiver configured to receive an identity request message from an application server of a third-party service provider that can provide a service to a subscriber of the IP-CAN, the identity request message including an IP address and port number. The subscriber identification server also comprises a processor configured to cause the server to interact with one or more nodes of the IP-CAN in order to resolve the received IP address and port number to a subscriber identifier associated with the subscriber by the IP-CAN, and to generate an identity response including the subscriber identifier; and a transmitter configured to send the identity response to the application server.

The processor may be configured to cause the server to interact with one or more nodes of the IP-CAN that include any of one or more Network Address Translation (NAT) functions of the IP-CAN, one or more proxy servers of the IP-CAN, and one or more nodes of the IP-CAN that store information regarding subscribers of the IP-CAN. The information stored by the one or more nodes of the IP-CAN may be binding information relating to one or more subscribers of the IP-CAN.

The processor may be configured to generate a subscriber lookup request message including the IP address and port number received from the application server, the transmitter may be further configured to send the subscriber lookup request message to a node of the IP-CAN that stores information regarding subscribers of the IP-CAN, and the receiver may be further configured to receive a subscriber lookup response message.

The processor may be further configured to use routing information stored at the server to identify any Network Address Translation (NAT) functions and proxy servers within the IP-CAN which messages sent between the subscriber and the application server will traverse, and to cause the server to successively interact with each identified NAT function and proxy server to resolve the IP address and port number received from the application server to an internal IP address and an internal port number initially allocated to the subscriber within the IP-CAN. The subscriber identification server may further comprise a memory storing the routing information.

The processor may be further configured to cause the server to successively contact each identified NAT function and proxy server in the order in which they would be traversed by a message sent by the application server to the subscriber and thereby perform reverse translation of the IP address and port number received from the application server to determine the internal IP address and the internal port number initially allocated to the subscriber within the IP-CAN.

The processor may be further configured to generate a subscriber lookup request message including the internal IP address and the internal port number initially allocated to the subscriber within the IP-CAN, the transmitter may be further configured to send the subscriber lookup request message to a node of the IP-CAN that stores information regarding subscribers of the IP-CAN, and the receiver may be further configured to receive a subscriber lookup response message.

The processor may be further configured to determine if the subscriber lookup response includes a subscriber identifier and, if not, to generate a further subscriber lookup request message including the IP address and port number received from the application server, the transmitter may be further configured to send the further subscriber lookup request message to a further node of the IP-CAN that may store information regarding the subscriber, and the receiver may be further configured to receive a subscriber lookup response message from the further node of the IP-CAN.

According to a third aspect of the present invention there is provided a node configured for use within an IP Connectivity Access Network (IP-CAN). The node comprises a memory storing information regarding subscribers of the IP-CAN, a receiver configured to receive a subscriber lookup request message from a further node of the IP-CAN, the subscriber lookup request message including an IP address and port number, a processor configured to determine if the subscriber information includes a subscriber identifier associated with the received IP address and port number and to generate a subscriber lookup response, and a transmitter configured to send the subscriber lookup response to the further node of the IP-CAN.

The processor may be configured such that, if it is determined that the subscriber information does include a subscriber identifier associated with the received IP address and port number, then the processor is configured to include the determined subscriber identifier in the subscriber lookup response. The processor may be configured such that, if it is determined that the subscriber information does not include a subscriber identifier associated with the received IP address and port number, then the processor is configured to include an indication that the subscriber lookup has been unsuccessful in the subscriber lookup response.

The node may be configured to implement any one of a Policy and Charging Rules Function (PCRF), a Home Location Register (HLR), a Home Subscriber Server (HSS), a Packet Data Network Gateway (PDN-GW), a Gateway GPRS Support Node (GGSN), a Remote Authentication Dial In User Service (RADIUS) server, and a Serving Call Session Control Function (S-CSCF).

According to a fourth aspect of the present invention there is provided a method of ensuring that an identifier for a subscriber of an IP Connectivity Access Network (IP-CAN) is available to a third-party service provider that can provide a service to the subscriber. The method comprises, at an application server of the third-party service provider:

receiving a service request message from the subscriber, the service request message requesting access to the service;

obtaining a source IP address and source port number from the service request message;

generating an identity request message including the source IP address and source port number, the identity request message requesting a subscriber identifier associated with the source IP address and source port number;

sending the identity request message to a node of the IP-CAN; and receiving an identity response message from the node of the IP-CAN, the response including a subscriber identifier that the IP-CAN associates with the subscriber.

The method may further comprise determining a transport protocol used for the service request message, and identifying the transport protocol in the identity request message sent to the node of the IP-CAN. The method may also further comprise upon receipt of the service request message, decrypting the service request message.

According to a fifth aspect of the present invention there is provided a method of ensuring that an identifier for a subscriber of an IP Connectivity Access Network (IP-CAN) is available to a third-party service provider that can provide a service to the subscriber. The method comprises, at a subscriber identification server provided within the IP-CAN:

receiving an identity request message from an application server of the third-party service provider, the identity request message including an IP address and port number;

interacting with one or more nodes of the IP-CAN in order to resolve the received IP address and port number to a subscriber identifier associated with the subscriber by the IP-CAN;

generating an identity response including the subscriber identifier; and sending the identity response to the application server.

The one or more nodes of the IP-CAN may include any of one or more Network Address Translation (NAT) functions of the IP-CAN, one or more proxy servers of the IP-CAN, and one or more nodes of the IP-CAN that store information regarding subscribers of the IP-CAN. The information stored by the one or more nodes of the IP-CAN may be binding information relating to one or more subscribers of the IP-CAN.

The step of interacting with one or more nodes of the IP-CAN may comprise sending a subscriber lookup request message to a node of the IP-CAN that stores information regarding subscribers of the IP-CAN, the subscriber lookup request message including the IP address and port number received from the application server, and receiving a subscriber lookup response message.

The step of interacting with one or more nodes of the IP-CAN may comprise using routing information stored at the subscriber identification server to identify any Network Address Translation (NAT) functions and proxy servers within the IP-CAN which messages sent between the subscriber and the application server will traverse, and interacting successively with each identified NAT function and proxy server to resolve the IP address and port number received from the application server to an internal IP address and an internal port number initially allocated to the subscriber within the IP-CAN.

The step of interacting with each identified NAT function and proxy server may comprise successively contacting each identified NAT function and proxy server in the order in which they would be traversed by a message sent by the application server to the subscriber and thereby performing reverse translation of the IP address and port number received from the application server to determine the internal IP address and an internal port number initially allocated to the subscriber within the IP-CAN.

The step of interacting with one or more nodes of the IP-CAN may further comprise sending a subscriber lookup request message to a node of the IP-CAN that stores information regarding subscribers of the IP-CAN, the identity request message including the internal IP address and internal port number initially allocated to the subscriber within the IP-CAN, and receiving a subscriber lookup response.

The method may further comprise determining if the subscriber lookup response includes a subscriber identifier, if not, sending a further subscriber lookup request message to a further node of the IP-CAN that stores information regarding subscribers of the IP-CAN, and receiving a further subscriber lookup response message from the further node of the IP-CAN. The further subscriber lookup request message may include the IP address and port number received from the application server, or alternatively may include the internal IP address and internal port number initially allocated to the subscriber within the IP-CAN.

According to a sixth aspect of the present invention there is provided a method of ensuring that an identifier for a subscriber of an IP Connectivity Access Network (IP-CAN) is available to a third-party service provider that can provide a service to the subscriber. The method comprises, at a node of the IP-CAN that stores information regarding subscribers of the IP-CAN:

receiving a subscriber lookup request message from a further node of the IP-CAN, the subscriber lookup request message including an IP address and port number;

determining if the subscriber information includes a subscriber identifier associated with the received IP address and port number;

generating a subscriber lookup response; and sending the subscriber lookup response to the further node of the IP-CAN.

If the subscriber information does include a subscriber identifier associated with the received IP address and port number, the method may further comprise including the determined subscriber identifier in the subscriber lookup response. If the subscriber information does not includes a subscriber identifier associated with the received IP address and port number, the method may further comprise including an indication that the subscriber lookup has been unsuccessful in the subscriber lookup response.

The node of the IP-CAN may be any of a Policy and Charging Rules Function (PCRF), a Home Location Register (HLR), a Home Subscriber Server (HSS), a Packet Data Network Gateway (PDN-GW), a Gateway GPRS Support Node (GGSN), a Remote Authentication Dial In User Service (RADIUS) server, and a Serving Call Session Control Function (S-CSCF).

DETAILED DESCRIPTION

In order to at least mitigate the problems identified above there will now be described methods and apparatus for providing an identifier of a user/subscriber of an IP-CAN to a third-party service provider (3PSP) that can provide a service to the user/subscriber, even when the communication between the user/subscriber and the third-party service provider is encrypted. As described above, when the signalling messages sent by the subscriber to the 3PSP are encrypted, a proxy server within the IP-CAN cannot modify these messages to include the subscriber's identity. Therefore, according to the method, when the 3PSP receives a signalling message from a subscriber of the IP-CAN, the 3PSP determines the source IP address and port number from which the message has been sent, and sends a request for a subscriber identity to the IP-CAN including at least the source IP address and port number. The IP-CAN receives the request from the 3PSP, determines a subscriber identifier associated with the received IP address and port number, and responds to the 3PSP with the determined subscriber identifier. In order to implement this method, it is proposed that the conventional IP-CAN described above be enhanced with an additional node that can interact with other nodes of the IP-CAN in order to resolve a received IP address and port number to a subscriber identifier. This additional node will be referred to herein as a Subscriber Identification Server (SIS).

Figure 1:
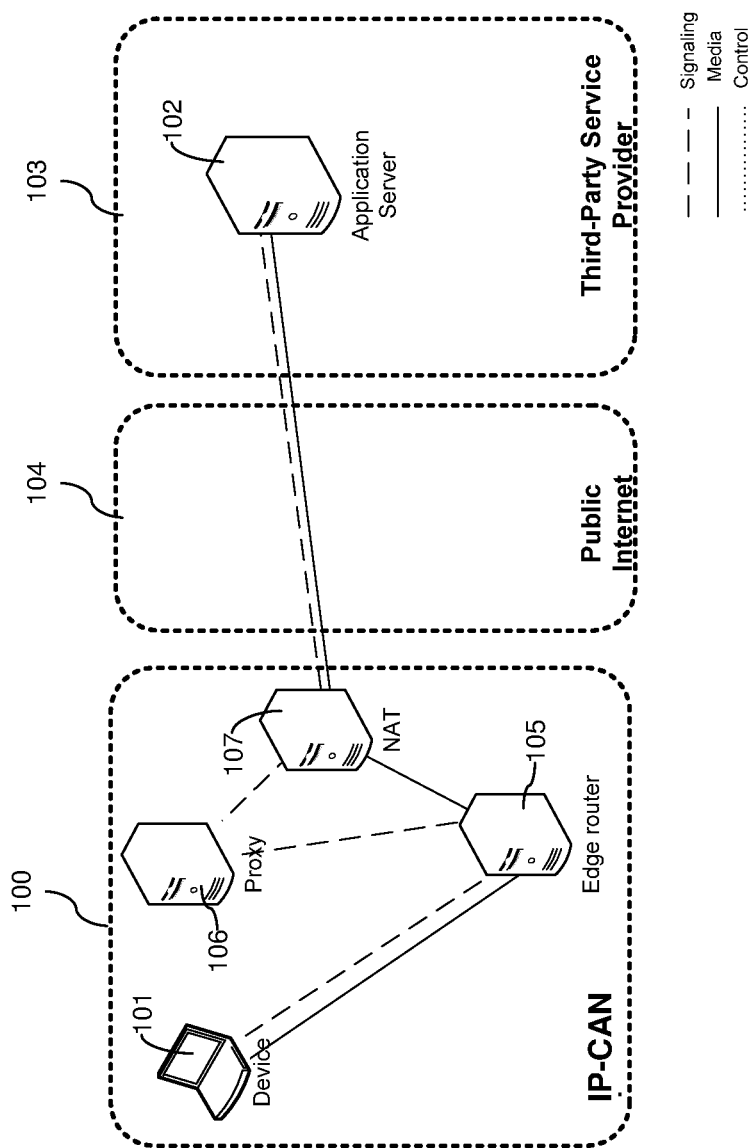
FIG. 1 illustrates schematically the interaction between a conventionally deployed IP-CAN and a third-party service provider (3PSP)
Figure 2:
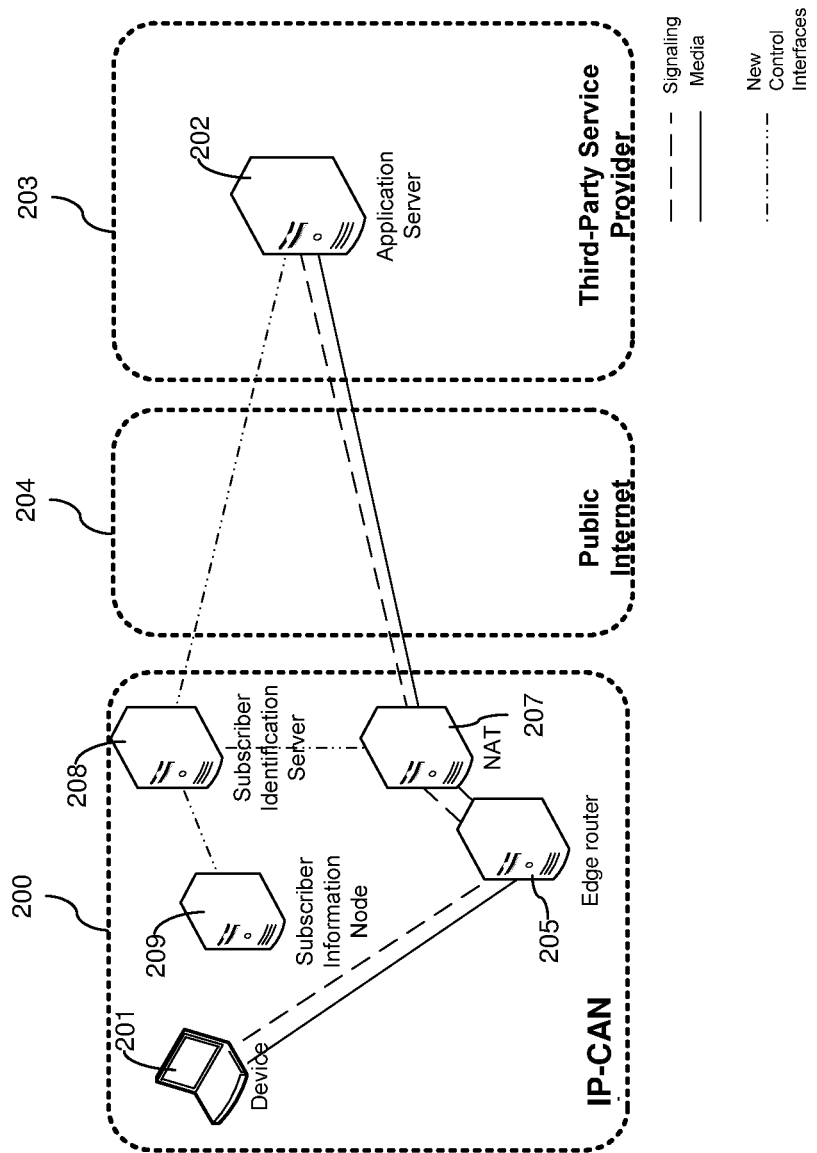
FIG. 2 illustrates schematically the interaction between an enhanced IP-CAN and a 3PSP, wherein the enhanced IP-CAN is configured to implement the methods described herein.

FIG. 2 illustrates schematically the interaction between an enhanced IP-CAN 200 and a 3PSP 203, wherein the enhanced IP-CAN 200 is configured to implement the method outlined above. The IP-CAN 200 is implemented by operator A and provides IP connectivity to a subscriber's device/terminal 201. The subscriber can therefore connect to an Application Server 202 of the 3PSP 203 via the public internet 204. As with the conventional IP-CAN 100 illustrated in FIG. 1, the enhanced IP-CAN 200 includes an edge router 205, and one or more NAT functions 207. However, the enhanced IP-CAN 200 also includes a Subscriber Identification Server (SIS) 208. This SIS 208 is configured to receive a request for a subscriber identity from the application server 202 of the 3PSP 203, the request including at least an IP address and port number associated with the subscriber. The SIS 208 is then configured to interact with one or more other nodes of the IP-CAN 200 in order to resolve the received IP address and port number to a subscriber identifier, and to respond to the third party application server 202 with the subscriber identity.

In order to implement this method, the SIS 208 is configured with an interface towards one or more 3PSPs. This interface is used to receive requests for a subscriber identifier from the 3PSPs, and to transmit responses to the 3PSPs. The SIS is also configured with an interface towards one or more Subscriber Information Nodes (SIN) 209 of the IP-CAN 200. A SIN 209 is any node of the IP-CAN that may have a binding between an IP address and port number allocated to the device 201 and an identifier of the subscriber (e.g., MSISDN, Public User Identity (IMPU) in IMS, IMSI, Anonymous Customer Reference (ACR) etc.). By way of example only, the SIN 209 can be any of a Home Subscriber Server (HSS), a Home Location Register (HLR), a Serving Call Session Control Function (S-CSCF), a PDN Gateway (P-GW), a Gateway GRPS Support Node (GGSN), a RADIUS server, a Policy and Charging Rules Function (PCRF), etc.

In addition, in an IP-CAN in which one or more NAT functions are present in the communication path, the SIS 208 will also be provided with an interface towards each NAT 207. Where one or more NAT functions are present in the communication path, the internal IP address and port number allocated to the device 201 will have been translated by each NAT, such that the IP address and port number received by the 3PSP and provided to the SIS 208 will be an external IP address and port number uniquely allocated by a NAT function. The SIS 208 can therefore use the NAT interface(s) to interact with each NAT 207 (which will maintain a binding between the untranslated and translated IP addresses and port numbers) in order to reverse this IP address and port number translation, and thereby obtain the internal IP address and port number initially allocated to the device 201. In this case, the SIS 208 can then use the internal IP address and port number obtained from the NAT(s) 207 when interacting with the SIN 209 in order to obtain the associated subscriber identifier.

Figure 3:
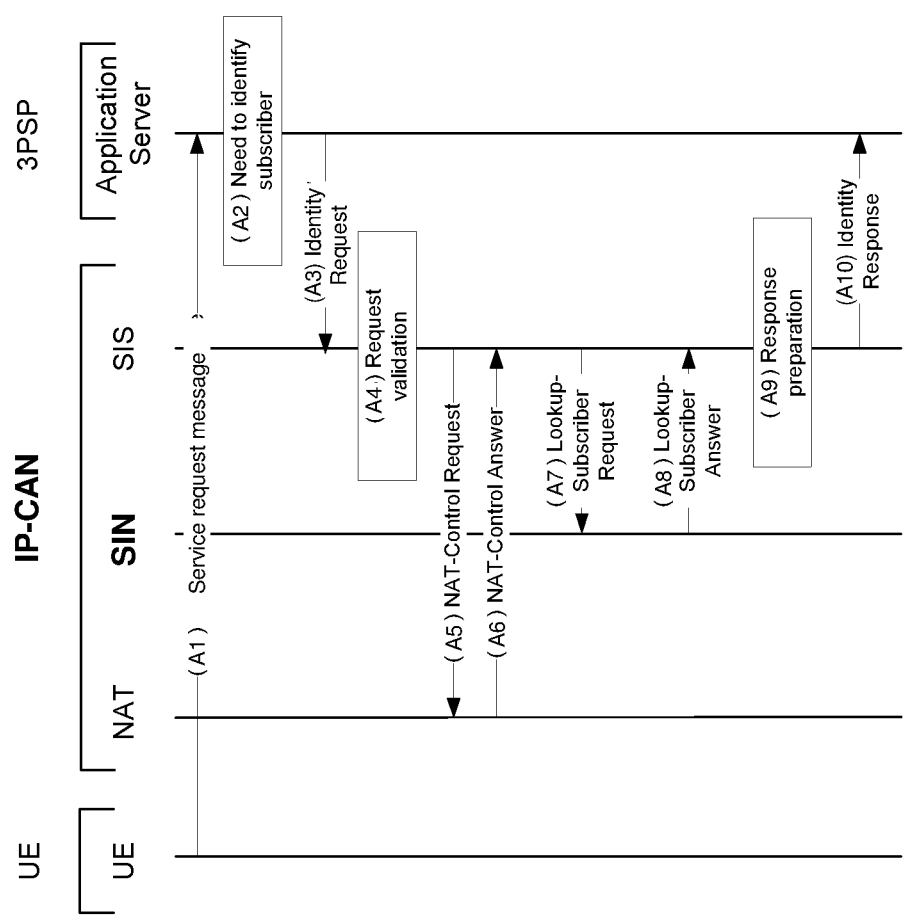
FIG. 3 illustrates an example signalling flow diagram illustrating the process of providing an identity of an IP-CAN subscriber to a 3PSP providing a service to the subscriber according to the methods described herein.

FIG. 3 illustrates an example signalling flow diagram illustrating the process of providing an identity of an IP-CAN subscriber to a 3PSP providing a service to the subscriber. The steps performed are as follows:

A1. The subscriber's device/user equipment (UE) generates and sends a service request message to the 3PSP requesting access to the service. The service request message is routed via the IP-CAN to an application server of the 3PSP where the request is received. In this example, the service request message is encrypted such that a proxy server within the IP-CAN is unable to add a subscriber identifier into the message.

A2. The application server decrypts the received service request message and determines that it is required to cooperate/interact with the subscriber's IP-CAN. The application server therefore determines that it requires an identifier for the subscriber that will be recognised by the IP-CAN as being associated with the subscriber.

A3. The application server then determines that the received request message does not include a suitable subscriber identifier, and therefore generates and sends an identity request message to a SIS in the subscriber's IP-CAN. The identity request message contains at least the source IP address and source port number received in the service request message. However, the identity request message could also include the transport protocol used for the service request message.

A4. The SIS receives the identity request message from the application server and validates the request. For example, this validation could include the SIS authenticating and authorizing the 3PSP application server.

A5. In this example, the IP-CAN implements a NAT function that will have translated the internal IP address and port number allocated to the subscriber's device/terminal. Consequently, the SIS queries the NAT function to obtain the session bindings. To do so, the SIS sends a NAT Control Request (NCR) message to the NAT function, the NCR including the IP address and port numbers received from the application server.

A6. The NAT function receives the NCR message, and responds with a NAT Control Answer (NCA) message including the NAT bindings corresponding to the IP address and port number pairs received in the NCR. In this regard, a NAT binding is the mapping maintained by the NAT between an external IP address and port pair (i.e. allocated for use outside the domain of the NAT) and an internal IP address and port pair (i.e. used within the domain of the NAT). The SIS receives a response from the NAT function, and thereby obtains the internal IP address and port number associated with the UE within the IP-CAN.

A7. The SIS then interacts with a SIN node of the IP-CAN in order to resolve the internal IP address and port number to a subscriber identity. To do so, the SIS generates and sends a lookup subscriber request message to a SIN within the IP-CAN that it believes will have a binding between the internal IP address and port number and an identifier of the subscriber. The lookup subscriber request includes the internal IP address and port number allocated to the subscriber's UE. For example, the SIS could send the lookup subscriber request message to a Policy and Charging Rules Function (PCRF) deployed within the IP-CAN.

A8. A SIN within the IP-CAN receives the lookup subscriber request message, and determines a subscriber identifier associated with the internal IP address and port number received in the message. The SIN then generates a lookup subscriber answer message including the associated subscriber identifier and sends the message to the SIS.

A9. The SIS receives a lookup subscriber answer including a subscriber identifier from the SIN, and prepares a response to the identity request message received from the 3PSP application server in step A4.

A10. The SIS then sends the identity response message, including the obtained subscriber identity, to the application server.

In step A1, the service request message received by the 3PSP application server from the UE takes the form of an IP packet. The application data within the message will therefore be encapsulated using a transport layer protocol. For example, the application data could be encapsulated within a TCP packet/segment (e.g. which might, for instance, be used for HTTP web browsing) or a UDP packet/datagram (e.g. in the case of SIP, or RTP, for instance). In step A2, if the 3PSP application server determines that it requires an identifier for the subscriber that will be recognised by the IP-CAN, the 3PSP application server will obtain and store the following information from the service request message:

Source IP address: this is the IP address of the UE as perceived by the 3PSP. As the message is sent over the Internet (i.e. using public IP addresses), this is a public IP address. If one or more NAT functions are present in the subscriber's IP-CAN, this IP address resolves to a NAT rather than the UE.

Source port: this is the port of the UE as perceived by the 3PSP. As with the IP address, if one or more NAT functions are present in the subscriber's IP-CAN, this port is allocated by a NAT rather than the UE.

Destination IP address: this is the IP address of the intended destination of the message, which in this case would be the IP address of the application server.

Destination port: this is the port to which the message is intended to be sent, which in this case would be the appropriate port of the application server.

Protocol: this is the transport layer protocol used in the message (e.g. TCP, UDP, etc.).

In step A3, the application server generates and sends an identity request message to a SIS in the subscriber's IP-CAN, and includes at least the source IP address and port number. There are several ways in which the identity request message could be implemented. By way of example, the SIS could be provided with a HTTP interface towards each of the 3PSPs with which the operator of the IP-CAN has an established relationship. In this case, if the IP-CAN has a domain name of example.com, then the HTTP interface of the SIS could be configured to handle requests with a URL such as http://sis.example.com:port/identity/.

The 3PSP application server could then be configured to send a HTTP POST request to this URL. The message body of the HTTP POST request would be an object containing a number of attributes, wherein this object may be encoded using the JavaScript Object Notation (JSON) format. The value of the Content-Type header field of the HTTP POST request would then be set to application/json. Expanding upon this example, the JSON object could contain five attributes, representing the information obtained from the service request message by the 3PSP application server:

sourceIPAddress
sourcePort
destinationIPAddress
destinationPort
protocol

An example JSON object for inclusion in a HTTP POST request that serves as an identity request message could take the form

```
{
"sourceIPAddress" : "192.0.2.60",
"sourcePort" : 34876,
"destinationIPAddress" : "198.51.100.20",
"destinationPort" : 80,
"protocol" : "tcp"
}
```

In order to prevent service abuse and security attacks, the communication between the 3PSP application server and the SIS in the subscriber's IP-CAN should preferably be secured. In particular, mutual authentication might be used so that each of the nodes can verify the identity of the other node. The SIS can then verify that the application server is duly authorized to use the identification service.

In step A4, the SIS receives the identity request message from the application server and validates the request. For example, in order to validate the identity request, the SIS would be configured to check that all the security credentials are valid. In particular, the SIS might confirm that the credentials presented by the application server are valid and have not expired. The SIS would then check the identity request for correctness, by checking that the request is syntactically correct and all the required data is available. The SIS would check that the application server is authorised to use the identification service provided by the SIS. For example, this could include the SIS performing a check that the request complies with a service level agreement established between the operator of the IP-CAN and the 3PSP (e.g. checking for request quotas, throughputs, etc.). Once the SIS has validated the identity request, then the SIS can proceed with resolving the source IP address and port number received from the application server to a subscriber identifier.

Steps A5 and A6 are only required if a NAT function is implemented within the subscriber's IP-CAN. If no IP address and/or port translation has been performed by the IP-CAN, then the process can proceed straight to step A7, as the source IP address and port number received from the application server will be the same as the IP address and port number used within the IP-CAN for the subscriber's UE. If there is a single NAT function in the subscriber's IP-CAN, then the SIS generates and sends a NAT Control Request (NCR) message to the NAT, as described above. For example, this NCR message can be implemented using the Diameter NAT Control Application (DNCA).

With respect to the DNCA, the SIS takes the role of a NAT controller, whilst the NAT function takes the role of a NAT-device, and the SIS maintains a Diameter connection to the NAT-device. Whenever the SIS needs to lookup binding information, it will issue a NAT-Control Request (NCR) command to the NAT, in which the NC-Request-Type AVP set to QUERY-REQUEST, to indicate that a binding lookup is being requested. The SIS will also include a number of AVPs in the NCR command in order to convey information to the NAT function, such as the source IP address and source port number received from the application server, which the NAT function can use to perform the binding lookup. If the binding is known to the NAT, it will return the internal (i.e. private) IP address and port number bound to the received IP address and port number in a NAT-Control Answer (NCA) command sent to the SIS. The SIS can then process the NCA command message, by inspecting the relevant AVPs, in order to extract the returned IP address for the binding.

If there is more than one NAT deployed in the subscriber's IP-CAN, then the process of resolving the received IP address and port number to the internal IP address and port number allocated to the subscriber's device/terminal becomes more complex. In this situation, the SIS needs to be configured with information regarding the network topology including the NAT hierarchy. In other words, the SIS needs to know which NAT functions were traversed by the service request message on its route towards the 3PSP application server, and in which order they were traversed. The SIS can then successively query each of these NAT functions in reverse order (i.e. the NAT traversed last is queried first). For the first NAT function queried, it uses the source IP address and source port number received in the identity request message received from the application server in step A3 as input for the binding lookup. For subsequent NAT functions, the SIS takes the internal IP address and port number returned by the previous NAT function, and uses them as the external IP address and port number inputs for the binding lookup by the current NAT function. As a result of this process, the SIS can obtain the IP address and port number originally allocated to the UE (referred to herein as the original/initial internal IP address and port number) that generated the initial application request message sent in step A1.

It is also noted that, depending upon the NAT function, the NAT function may require the SIS to identify the transport protocol (e.g. TCP, UDP, etc.) used for the signalling messages in order perform the reverse translation and resolve an external IP address and port number to an internal IP address and port number. In this case, the SIS would be configured to also include the transport protocol in the NAT Control Request message sent to a NAT function.

In step A7, the SIS then interacts with one or more SINs of the IP-CAN in order to resolve the initial internal IP address and port number to a subscriber identifier. As described above, a SIN 209 is any node of the IP-CAN that may have a binding between an IP address and port number allocated to the subscriber's UE and an identifier of the subscriber. The SIN(s) queried by the SIS will depend upon network deployment of the IP-CAN operator. For example, the SIN(s) queried by the SIS could be one or more of the following nodes:

a Policy and Charging Rules Function (PCRF), as the PCRF performs session binding associating a UE identity with an IP address allocated to the UE for an IP-CAN session;
a Home Location Register (HLR), for GPRS data services offered over 2G and 3G networks;
a Home Subscriber Server (HSS), for data services offered over LTE networks;
a Packet Data Network Gateway (PDN-GW)
a Gateway GPRS Support Node (GGSN);
a RADIUS server, as the RADIUS server is responsible for assigning IP addresses at network attachment; and
a Serving Call Session Control Function (S-CSCF) of an IMS network, as the S-CSCF will have authenticated and registered the UE and is therefore aware of the subscriber identification.

By way of example only, if one of the SINs to be queried by the SIS is a PCRF, then a new interface is required between the PCRF and the SIS. This interface could be based on the Diameter protocol in order to implement a Look Subscriber operation that is used to lookup the identity of a subscriber bound to an IP-CAN session identified by an IP address. This Look Subscriber operation could be implemented with request and answer messages that take the form:

Lookup-Subscriber Request: This message would be sent from the SIS to the PCRF, and would at least include an AVP, such as Framed-IP-Address, for conveying the IP address belonging to the IP-CAN session.
Lookup-Subscriber Answer: This message would be sent form the PCRF to the SIS as a response to a Lookup-Subscriber Request, and would at least include the subscriber identifier in an AVP such as Subscription-Id.

On reception of a Lookup-Subscriber Request message, the PCRF would be configured to determine a subscriber identifier by performing an internal lookup in its IP-CAN session internal structures, in an implementation-dependant way. When it comes to returning the determined subscriber identifier, the PCRF could be configured to use policy decisions to decide which identifier to return (e.g. MSISDN, IMSI, etc.). The PCRF would then generate a Lookup-Subscriber Answer message including the associated subscriber identifier and sends the message to the SIS, as per step A8.

If the network deployed by the operator comprises several PCRFs, the SIS would be required to be able to route the query to the PCRF that controls the IP-CAN session associated with the IP address. To do so, the SIS could be pre-configured/provisioned with information mapping IP address ranges to each PCRF. Alternatively, the SIS could make use of a Diameter Routing Agent (DRA) to route the request to the appropriate PCRF. A DRA is a functional element that ensures that all Diameter sessions established for a particular IP-CAN session reach the same PCRF when multiple and separately addressable PCRFs have been deployed in a Diameter realm.

In order to determine which nodes of the IP-CAN it should interact with to resolve an initial internal IP address and port number to a subscriber identifier, the SIS will be configured with a list of SINs that it should contact. The SIS could then be configured to contact each of the SINs in the list sequentially, or the SIS could be configured to identify one or more SINs from the list based on the details of the identity request. For example, the list could identify a number of different nodes within the IP-CAN that can function as a SIN, wherein each of the identified SINs is responsible for a different range of IP addresses. The SIS could then be configured to use the initial internal IP address to determine which of the SINs it should contact in order to obtain the subscriber identifier.

If the SIS is configured to sequentially contact each of the SINs in a preconfigured list, then the subscriber lookup request sent to one or more of these SINs could be unsuccessful, as it may be the case that one or more of the identified SINs does not store information regarding the subscriber that enables it to determine a subscriber identifier. In this case, a SIN that receives a subscriber lookup request, but that cannot resolve the IP address and port number included in the request to a subscriber identifier, will be configured to send a subscriber lookup response to the SIS indicating that the subscriber lookup has been unsuccessful. Upon receipt of a subscriber lookup response that indicates that the subscriber lookup has been unsuccessful, the SIS will then be configured to contact the next SIN identified in the list in an attempt to retrieve the subscriber identifier.

In step A9, after the SIS has obtained the subscriber identifier, the SIS generates a response to the identity request message received from the 3PSP application server. Following on from the above example, in which the SIS is provided with a HTTP interface towards the 3PSP, this response could also be implemented using HTTP.

In the case of any error in the processor of subscriber identification, the status line of the HTTP response would include a relevant HTTP status code, such as 500, together with a suitable Reason-Phrase. In the case of successful subscriber identification, the status line of the HTTP response would then include a 200 OK status code. As with the HTTP POST request, the message body of the HTTP response would be an object encoded using the JSON format, and the value of the Content-Type header field of the HTTP response would then be set to application/json. However, the JSON object would contain a single attribute, representing the subscriber identifier determined in and received from the SIN. An example JSON object for inclusion in a HTTP response that serves as an identity response message could take the form:

```
{
"identifier" : "tel:+34600000001"
}
```

Depending upon the policy of the network operator, the subscriber identifier sent to the 3PSP could be obfuscated in such a way that protects customer privacy whilst also preserving the identification relevance to the 3PSP.

In some network deployments, one or more proxies (such as a HTTP proxy, RTSP proxy, or SIP proxy) could be located between the subscriber's UE and the edge of the IP-CAN (e.g. a NAT function located in the IP-CAN). In this configuration, the IP address received from the 3PSP application server, or received from a NAT function queried by the SIS, is the IP address allocated to a proxy rather than the UE. In this case, the SIS would be configured with knowledge of this proxy, and would therefore be configured to query the proxy using the source IP address and port number and the destination IP address and the port number received from either the 3PSP application server or a NAT function queried by SIS. The proxy server would then be configured to use these source and destination IP addresses and port numbers to determine the original IP address and port number of the subscriber's UE, and to respond to the SIS with this information. The SIS can then use the original IP address and port number received from the proxy server to query a SIN for a subscriber identifier.

Figure 5:
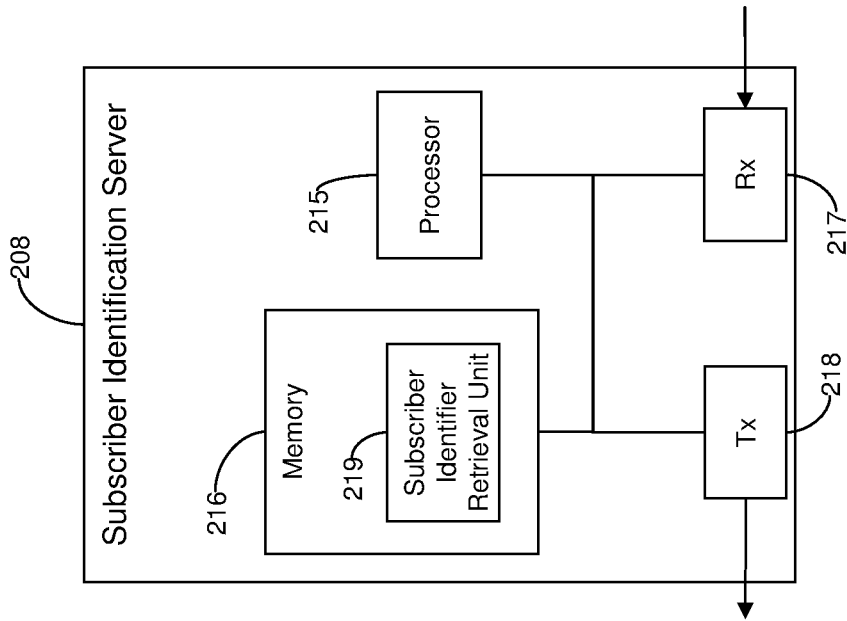
FIG. 5 illustrates schematically an example of a Subscriber Identification Server of an IP-CAN configured to implement the methods described herein.
Figure 4:
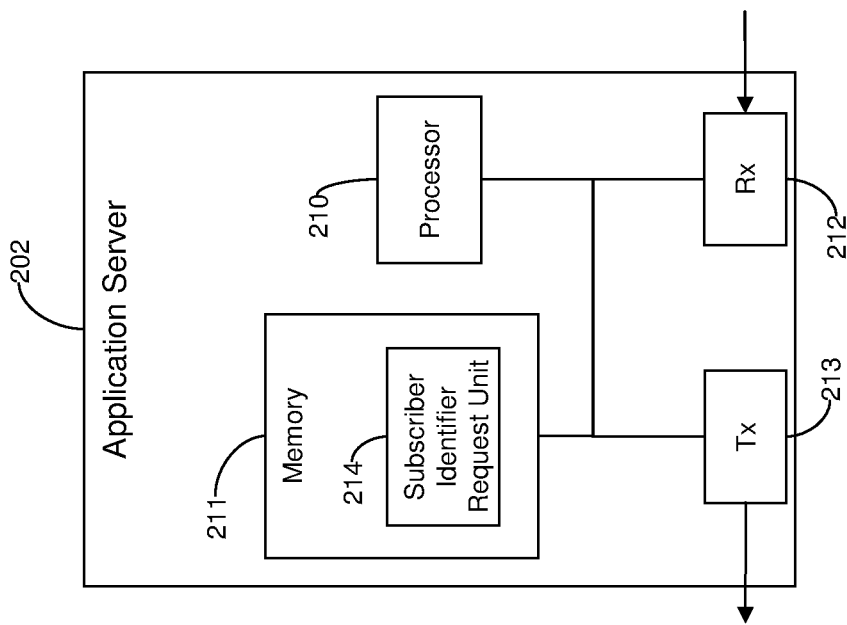
FIG. 4 illustrates schematically an example of an application server for providing a third party service to a subscriber of an IP-CAN, and configured to implement the methods described herein.

FIG. 4 illustrates schematically an example of an application server (AS) 202 for providing a third party service to a subscriber of an IP-CAN, and for implementing the methods described above. The AS 202 can be implemented as a combination of computer hardware and software. The AS 202 comprises a processor 210, a memory 211, a receiver 212 and a transmitter 213. The memory 211 stores the various programs/executable files that are implemented by the processor 210, and also provides a storage unit for any required data. For example, this data can include but is not limited to the contact information or identity of a SIS within an IP-CAN that the AS 202 can cooperate with. The programs/executable files stored in the memory 211, and implemented by the processor 210, include but are not limited to a subscriber identifier request unit 214. The subscriber identifier request unit 214 can be configured to process a service request message received from a subscriber of an IP-CAN to obtain a source IP address and source port number, and to generate an identity request message requesting a subscriber identifier associated with the source IP address and source port number. The receiver 212 can be configured to receive a service request message from a subscriber, and to receive an identity response message from a Subscriber Identification Server of the subscriber's IP-CAN. The transmitter 213 can be configured to transmit the identity request message to the Subscriber Identification Server, FIG. 5 illustrates schematically an example of a Subscriber Identification Server (SIS) 208 of an IP-CAN suitable for implementing the methods described above. The SIS 208 can be implemented as a combination of computer hardware and software. The SIS 208 comprises a processor 215, a memory 216, a receiver 217 and a transmitter 218. The memory 216 stores the various programs/executable files that are implemented by the processor 215, and also provides a storage unit for any required data. For example, this data can include but is not limited to routing information identifying any NAT functions and/or proxy servers within the IP-CAN which messages sent between a subscriber of the IP-CAN and a 3PSP will traverse, and the order in which they are traversed. In addition, the data can include information identifying any other nodes of the IP-CAN that may store binding information relating to a subscriber (e.g. a list of SINs). The programs/executable files stored in the memory 216, and implemented by the processor 215, include but are not limited to a subscriber identifier retrieval unit 219. The subscriber identifier retrieval unit 219 can be configured to cause the SIS 208 to interact with one or more nodes of the IP-CAN in order to resolve an IP address and port number received from a 3PSP in an identity request to a subscriber identifier associated with the subscriber by the IP-CAN. The subscriber identifier retrieval unit 219 can then generate an identity response including the retrieved subscriber identifier. The receiver 217 can be configured to receive an identity request message from a 3PSP, and to receive a subscriber lookup response message from other nodes of the IP-CAN. The transmitter 218 can be configured to transmit a subscriber lookup request message to other nodes of the IP-CAN, and to transmit an identity response message to the 3PSP.

Figure 6:
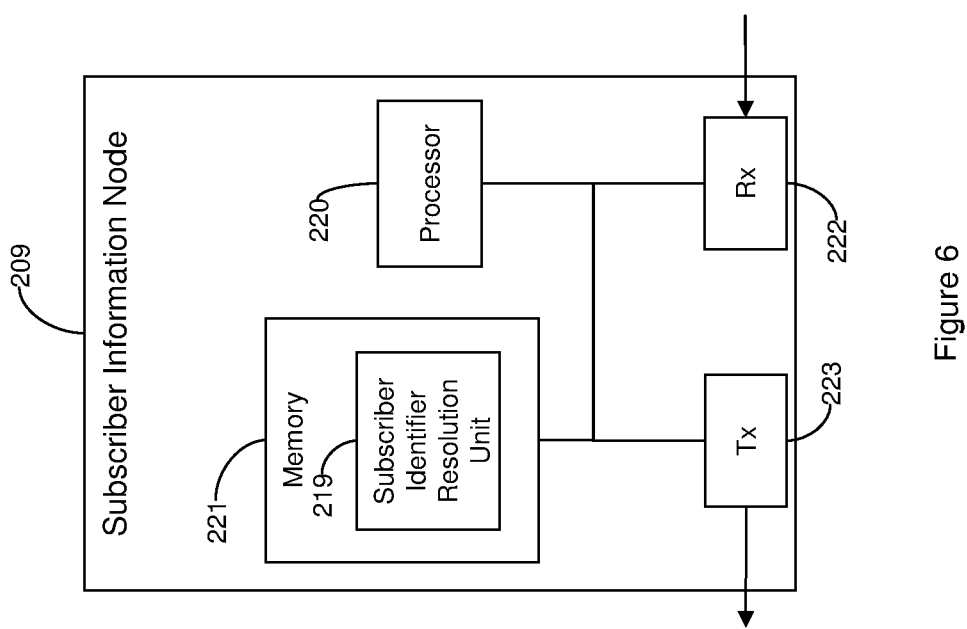
FIG. 6 illustrates schematically an example of a Subscriber Information Node of an IP-CAN configured to implement the methods described herein.

FIG. 6 illustrates schematically an example of a Subscriber Information Node (SIN) 209 of an IP-CAN suitable for implementing the methods described above. The SIN 209 can be implemented as a combination of computer hardware and software. The SIN 209 comprises a processor 220, a memory 221, a receiver 222 and a transmitter 223. The memory 221 stores the various programs/executable files that are implemented by the processor 220, and also provides a storage unit for any required data. For example, this data can include but is not limited to binding information that stores a binding between the internal IP address and port number allocated to a subscriber's device and an identifier of the subscriber. The programs/executable files stored in the memory 221, and implemented by the processor 220, include but are not limited to a subscriber identifier resolution unit 224. The subscriber identifier resolution unit 224 can be configured to attempt to determine a subscriber identifier associated with an IP address and port number received from a SIS of the IP-CAN in a subscriber lookup request message, and to generate a subscriber lookup response. The receiver 222 can be configured to receive the subscriber lookup request message from the SIS. The transmitter 223 can be configured to transmit the subscriber lookup response message to the SIS.

The methods and apparatus described above provide that a third-party service provider, providing a service to a subscriber of an IP-CAN, can obtain an identity of the subscriber that will be recognised by the IP-CAN as being associated with the subscriber, even if the communication between the subscriber and the third-party service provider is encrypted. In doing so, these methods and apparatus enable the third-party service provider to cooperate/interact with the subscriber's IP-CAN to implement charging, revenue sharing etc. In addition, by enabling cooperation/interaction between a third-party service provider and a subscriber's IP-CAN, the methods and apparatus described above also provide for delivery of enhanced services by the third-party service provider, as it is then possible to further personalise or adapt the service to the subscriber by sharing information between the two otherwise separate user domains.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. An application server configured to provide a third-party service to a subscriber of an IP Connectivity Access Network, IP-CAN, comprising:
a first receiver configured to receive a service request message from the subscriber, the service request message requesting access to the third-party service;
a processor configured to obtain a source IP address and source port number from the service request message, and to generate an identity request message including the source IP address and source port number, the identity request message requesting a subscriber identifier associated with the source IP address and source port number;
a transmitter configured to send the identity request message to a node of the IP-CAN; and
a second receiver configured to receive an identity response from the node of the IP-CAN, the identity response including a subscriber identifier that the IP-CAN associates with the subscriber,
wherein the subscriber identifier is based on an internal IP address and an internal port number allocated to the subscriber within the IP-CAN.

2. The application server of claim 1, wherein the processor is further configured to determine a transport protocol used for the service request message, and to identify the transport protocol in the identity request message sent to the node of the IP-CAN.

3. A subscriber identification server configured for use within an IP Connectivity Access Network, IP-CAN, comprising:
a receiver configured to receive an identity request message from an application server of a third-party service provider that can provide a service to a subscriber of the IP-CAN, the identity request message including a source IP address and a source port number;
a processor configured to:
use routing information stored at the subscriber identification server to identify one or more nodes of the IP-CAN, which messages sent between the subscriber and the application server traverse,
cause the subscriber identification server to successively interact with each one or more nodes to resolve the source IP address and the source port number to an internal IP address and an internal port number allocated to the subscriber within the IP-CAN,
determine a subscriber identifier associated with the subscriber and based on the internal IP address and the internal port number, and
generate an identity response including the subscriber identifier; and
a transmitter configured to send the identity response to the application server.

4. The subscriber identification server of claim 3, wherein the processor is configured to cause the server to interact with one or more nodes of the IP-CAN that include any of:
one or more Network Address Translation, NAT, functions of the IP-CAN;
one or more proxy servers of the IP-CAN; and
one or more nodes of the IP-CAN that stores information regarding subscribers of the IP-CAN.

5. The subscriber identification server of claim 4, wherein the processor is further configured to cause the server to successively contact each identified NAT function and proxy server in the order in which they would be traversed by a message sent by the application server to the subscriber and thereby perform reverse translation of the source IP address and the source port number received from the application server to determine the internal IP address and the internal port number initially allocated to the subscriber within the IP-CAN.

6. The subscriber identification server of claim 3, wherein the processor is configured to generate a subscriber lookup request message including the source IP address and the source port number received from the application server, the transmitter is further configured to send the subscriber lookup request message to a node of the IP-CAN that stores information regarding subscribers of the IP-CAN, and the receiver is further configured to receive a subscriber lookup response message.

7. The subscriber identification server of claim 3, and further comprising:
a memory storing the routing information.

8. The subscriber identification server of claim 3, wherein the processor is further configured to generate a subscriber lookup request message including the internal IP address and the internal port number initially allocated to the subscriber within the IP-CAN, the transmitter is further configured to send the subscriber lookup request message to a node of the IP-CAN that stores information regarding subscribers of the IP-CAN, and the receiver is further configured to receive a subscriber lookup response message.

9. A node configured for use within an IP Connectivity Access Network, IP-CAN, comprising:
a memory storing subscriber information regarding subscribers of the IP-CAN;
a receiver configured to receive a subscriber lookup request message from a further node of the IP-CAN, the subscriber lookup request message including an IP address and port number;
a processor configured to determine if the subscriber information includes a subscriber identifier associated with the received IP address and port number, wherein the subscriber identifier is based on an internal IP address and an internal port number allocated to the subscriber within the IP-CAN, and to generate a subscriber lookup response; and
a transmitter configured to send the subscriber lookup response to the further node of the IP-CAN.

10. The node of claim 9, wherein the node is configured to implement any one of:
a Policy and Charging Rules Function, PCRF;
a Home Location Register, HLR;
a Home Subscriber Server, HSS;
a Packet Data Network Gateway, PDN-GW;
a Gateway GPRS Support Node, GGSN
a Remote Authentication Dial In User Service, RADIUS, server; and
a Serving Call Session Control Function, S-CSCF.

11. A method of ensuring that an identifier for a subscriber of an IP Connectivity Access Network, IP-CAN, is available to a third-party service provider that can provide a service to the subscriber, comprising:
at an application server of the third-party service provider:
receiving a service request message from the subscriber, the service request message requesting access to the service;
obtaining a source IP address and source port number from the service request message;
generating an identity request message including the source IP address and source port number, the identity request message requesting a subscriber identifier associated with the source IP address and source port number;
sending the identity request message to a node of the IP-CAN; and
receiving an identity response message from the node of the IP-CAN, the response including a subscriber identifier that the IP-CAN associates with the subscriber,
wherein the subscriber identifier is based on an internal IP address and an internal port number allocated to the subscriber within the IP-CAN.

12. The method of claim 11, further comprising:
determining a transport protocol used for the service request message, and identifying the transport protocol in the identity request message sent to the node of the IP-CAN.

13. A method of ensuring that an identifier for a subscriber of an IP Connectivity Access Network, IP-CAN, is available to a third-party service provider that can provide a service to the subscriber, the method comprising:

at a subscriber identification server provided within the IP-CAN:
receiving an identity request message from an application server of the third-party service provider, the identity request message including a source IP address and a source port number;
using routing information stored at the subscriber identification server to identify one or more nodes of the IP-CAN, which messages sent between the subscriber and the application server traverse;
interacting with each one or more nodes of the IP-CAN to resolve the source IP address and the source port number to an internal IP address and an internal port number allocated to the subscriber within the IP-CAN;
determining a subscriber identifier associated with the subscriber and based on the internal IP address and the internal port number;
generating an identity response including the subscriber identifier; and
sending the identity response to the application server.

14. The method of claim 13, wherein the one or more nodes of the IP-CAN includes any of:
one or more Network Address Translation, NAT, functions of the IP-CAN;
one or more proxy servers of the IP-CAN; and
one or more nodes of the IP-CAN that store information regarding subscribers of the IP-CAN.

15. The method of claim 14, wherein interacting with each identified NAT function and proxy server comprises:
successively contacting each identified NAT function and proxy server in the order in which they would be traversed by a message sent by the application server to the subscriber and thereby performing reverse translation of the source IP address and the source port number received from the application server to determine the internal IP address and the internal port number initially allocated to the subscriber within the IP-CAN.

16. The method of claim 13, wherein interacting with one or more nodes of the IP-CAN comprises:
sending a subscriber lookup request message to a node of the IP-CAN that stores subscriber information regarding subscribers of the IP-CAN, the subscriber lookup request message including the source IP address and the source port number received from the application server; and
receiving a subscriber lookup response message.

17. The method of claim 13, wherein interacting with one or more nodes of the IP-CAN further comprises:
sending a subscriber lookup request message to a node of the IP-CAN that stores information regarding subscribers of the IP-CAN, the subscriber lookup request message including the internal IP address and internal port number initially allocated to the subscriber within the IP-CAN; and
receiving a subscriber lookup response.

18. The method of claim 16, further comprising:
determining if the subscriber lookup response includes a subscriber identifier; and
if not, sending a further subscriber lookup request message to a further node of the IP-CAN that stores information regarding subscribers of the IP-CAN; and
receiving a further subscriber lookup response message from the further node of the IP-CAN.

* * * * *